(12) United States Patent
Masuda et al.

(10) Patent No.: US 8,151,627 B2
(45) Date of Patent: *Apr. 10, 2012

(54) KNOCK DETECTION DEVICE AND KNOCK DETECTION SYSTEM DIAGNOSIS DEVICE

(75) Inventors: Satoshi Masuda, Kariya (JP); Hirohiko Yamada, Okazaki (JP); Naoki Kokubo, Nukata-gun (JP); Shuhei Oe, Kariya (JP)

(73) Assignees: Denso Corporation, Kariya (JP); Nippon Soken, Inc., Nishio (JP)

( * ) Notice: Subject to any disclaimer, the term of this patent is extended or adjusted under 35 U.S.C. 154(b) by 471 days.

This patent is subject to a terminal disclaimer.

(21) Appl. No.: 12/388,651

(22) Filed: Feb. 19, 2009

(65) Prior Publication Data
US 2009/0223281 A1   Sep. 10, 2009

(30) Foreign Application Priority Data

Mar. 5, 2008 (JP) .................................. 2008-54920
Mar. 6, 2008 (JP) .................................. 2008-55727

(51) Int. Cl.
*G01M 15/12* (2006.01)
(52) U.S. Cl. .................................. 73/35.06; 73/114.07
(58) Field of Classification Search .................. 73/35.01, 73/35.03, 35.06, 35.09, 114.07
See application file for complete search history.

(56) References Cited

U.S. PATENT DOCUMENTS

| | | | |
|---|---|---|---|
| 6,932,056 B1 * | 8/2005 | Tartt ........................... | 123/406.37 |
| 6,988,483 B1 | 1/2006 | Hagari | |
| 7,206,691 B2 * | 4/2007 | Kaneko et al. ................ | 701/111 |
| 7,243,529 B2 * | 7/2007 | Takemura et al. ........... | 73/35.09 |
| 7,669,459 B2 * | 3/2010 | Yoshihara et al. ........... | 73/35.06 |
| 7,677,083 B2 * | 3/2010 | Oe et al. ........................ | 73/35.09 |
| 7,874,200 B2 * | 1/2011 | Oe et al. ........................ | 73/35.09 |
| 7,945,379 B2 * | 5/2011 | Kaneko et al. ................ | 701/111 |
| 2006/0185422 A1 * | 8/2006 | Iwade et al. .................. | 73/35.09 |
| 2007/0012090 A1 | 1/2007 | Yoshihara et al. | |
| 2007/0214869 A1 * | 9/2007 | Kaneko et al. ................ | 73/35.09 |
| 2008/0276689 A1 * | 11/2008 | Tanaya et al. ................ | 73/35.09 |
| 2008/0294328 A1 * | 11/2008 | Kaneko et al. ................ | 701/111 |
| 2009/0150058 A1 * | 6/2009 | Kaneko et al. ................ | 701/111 |

FOREIGN PATENT DOCUMENTS

| JP | 2004-270626 | 9/2004 |
|---|---|---|
| JP | 2005-188297 | 7/2005 |

OTHER PUBLICATIONS

US Patent Application of Masuda et al, U.S. Appl. No. 12/388,616, filed Feb. 19, 2009.

* cited by examiner

*Primary Examiner* — Eric S McCall
(74) *Attorney, Agent, or Firm* — Nixon & Vanderhye P.C.

(57) ABSTRACT

An output signal of a knock sensor is converted by an A/D conversion part in a specified knock determination range. In a time-frequency analysis part, data of frequency, time, and vibration intensity are extracted at the same time from an output signal of the knock sensor, and the time-varying patterns of vibration intensities in multiple frequency ranges are extracted. A knock determination part computes the number of time-varying patterns of vibration intensity which rise at same time. The knock determination part executes a knock determination based on whether the number of the time-varying patterns of vibration intensity is greater than a knock determination threshold.

11 Claims, 13 Drawing Sheets

KNOCK DETECTION DEVICE AND KNOCK DETECTION SYSTEM DIAGNOSIS DEVICE

CROSS-REFERENCE TO RELATED APPLICATION

This application is based on Japanese Patent Applications No. 2008-54920 filed on Mar. 5, 2008, and No. 2008-55727 filed on Mar. 6, 2008, the disclosures of which are incorporated herein by reference.

FIELD OF THE INVENTION

The present invention relates to a knock detection device for an internal combustion engine. The knock detection device detects a knock on the basis of a time-varying pattern of vibration intensity extracted from an output signal of a knock signal output device.

The present invention also relates to a knock detection system diagnosis device for determining whether a knock signal output device is faulty on the basis of the vibration intensities of multiple frequency ranges extracted from the output signal of the knock signal output device.

BACKGROUND OF THE INVENTION

As described in JP-2005-188297A, when a knock is caused, a phenomenon called "a low frequency shift" is caused. In the low frequency shift, a peak frequency of a vibration component specific to the knock gradually shifts to a lower frequency side. When a peak frequency of vibration component of one knock frequency range extracted from the output signal of the knock sensor gradually shifts to a lower frequency side, it is determined that a knock is caused.

An internal combustion engine is provided with various systems such as a variable valve timing controller and a super-charger in order to improve an output, a fuel economy and an environmental performance. A direct injection engine varies a fuel injection timing according to a combustion mode. Thus, many kinds of noises tend to superimpose on the signal of the knock sensor in a knock determination range. However, in the knock detection apparatus described in JP-2005-188297A, it is only determined whether a vibration component of one knock frequency range shifts to a lower frequency side in time sequence. Thus, as shown in FIG. 4, when a plurality of noises are superimposed on the signal of the knock sensor in time sequence in one knock determination range, there is a possibility of making an erroneous determination that one continuous vibration component will shift apparently to a lower frequency side. Therefore, when it is only determined whether the vibration component of one frequency range shifts to a lower frequency side, there is a possibility of making an erroneous determination that a knock is caused.

A noise generated by a single vibration, such as a valve seating noise or a direct-injection injector noise, does not continue for a long period like a knock vibration. However, there is a noise continuing for a long period in a specified frequency like a piston slap noise generated due to a piston sliding on a cylinder inner wall. Such a noise continuing for a long time in a specified frequency may cause an erroneous knock determination.

JP-2006-29158A corresponding to U.S. Pat. No. 6,988,483B1 describes an apparatus detecting a faulty of a knock sensor. This apparatus is provided with a bias means for pulling up and down an output of a knock sensor. A determination is made as to whether the knock sensor is faulty on the basis of the direct current component of the bias means.

JP-2004-270626A describes an apparatus detecting a faulty of a knock sensor. In this apparatus, a counter counts the number of times when the output signal of a knock sensor is smaller than a determination value for each cylinder. When the count value of the counter becomes larger than a specified value, it is determined that the knock sensor is faulty.

SUMMARY OF THE INVENTION

The present invention is made in view of the above matters, and it is an object of the present invention to provide a knock detection device for an internal combustion engine, which can avoid an erroneous knock determination due to noises being superimposed on the output signal of a knock signal output device. Hence, a knock determination accuracy is enhanced.

Another object of the present invention is to provide a knock detection system diagnosis device capable of determining whether a knock signal output device is faulty with a high accuracy.

According to the present invention, a knock detection device includes a knock signal output means for outputting an output signal of which waveform is varied according to a knock caused while the internal combustion engine is operated. The device includes a vibration intensity extraction means for extracting time-varying patterns of vibration intensities in multiple frequency ranges from an output signal of the knock signal output means. The device further includes a knock determination means for executing a knock determination based on a number of the time-varying patters of vibration intensity which rise at a same time.

When knock is caused, not only a knock vibration component of a basic frequency of the knock (first-order resonance frequency which is determined by a bore of a cylinder, for example, 7.5 kHz), but also knock vibration components develop at the same time in a plurality of higher-order resonance frequency ranges. A phenomenon that plural noises are continuously caused like a low frequency shift is not a phenomenon that develops in multiple frequency ranges at the same time but a phenomenon that develops in only one frequency range. Moreover, a noise continuing for a long time period, such as a piston slap noise, develops in only one specified frequency range.

According to the present invention, even if a low frequency shift or a piston slap noise that cannot be distinguished from a knock is developed in any one of frequency range due to a noise being superimposed on the output signal of the knock signal output means, it is possible to prevent making an erroneous determination that such noises are knocks and hence to increase a knock determination accuracy.

The time-varying patterns of vibration intensity of multiple frequency ranges can be extracted by a time-frequency analysis of the output signal of the knock signal output means. The time-frequency analysis includes a short-time Fourier transform (STFT), a wavelet transform, a Wigner distribution. By performing the time-frequency analysis, the data of frequency, time, and vibration intensity can be extracted at the same time from the output signal of the knock signal output means, and the time-varying patterns of vibration intensities in multiple frequency ranges can be produced.

Alternatively, the multiple-frequency-ranges vibration intensity extraction means may process the output signal of the knock signal output means by a plurality of band pass filters extracting a plurality of specified frequency ranges to extract the time-varying patterns of vibration intensities of multiple frequency ranges. With this, the time-varying patterns of vibration intensities of multiple frequency ranges can be also simply extracted from the output signal of the knock signal output means.

According to another aspect of the present invention, a diagnosis device includes a knock signal output means for outputting an output signal of which waveform is varied according to a knock caused while the internal combustion engine is operated. The device includes a vibration intensity extraction means for extracting time-varying patterns of vibration intensities in multiple frequency ranges from an output signal of the knock signal output means. The device further includes a diagnosis means for executing a diagnosis of the knock signal output means based on a number of the time-varying patters of vibration intensity which rise at a same time.

When knock is caused, not only a knock vibration component of a basic frequency of the knock (first-order resonance frequency, for example, 7.5 kHz), but also knock vibration components develop at the same time in a plurality of higher-order resonance frequency ranges.

When the number of the time-varying patterns of vibration intensity which rise at the same time is large, it is determined that a knock is correctly detected and the knock signal output means is normal. When the number of the time-varying patterns of vibration intensity which rise at the same time is small, it is determined that a knock is not correctly detected and the knock signal output means is faulty.

Alternatively, a diagnosis means may determine whether the knock signal output means is faulty based on a number of the time-varying patterns of vibration intensity which rise at a same time during a period in which a vibration noise is generated or a vibration noise is compulsorily generated. The vibration noise includes, for example, a noise caused when the valve is seated, and a noise caused when the injector directly injects fuel. These vibration noises are characterized in that vibration rises in two frequency ranges at the same timing. Therefore, during a period in which the vibration noise is generated or the vibration noise is compulsorily generated, if the number of the time-varying patterns of vibration intensity which rise at the same time is two, it is determined that the vibration noise is normally detected and the knock signal output means is normal. If the number of the time-varying patterns of vibration intensity is not two, it is determined that the vibration noise is not normally detected and the knock signal output means is faulty.

In this a case, during a diagnosis, the ignition timing may be retarded to restrict an occurrence of knock. With this, the diagnosis can be performed under a condition where only vibration noise is caused without any knock, so that it is possible to increase the accuracy of diagnosis of the knock signal output means.

Alternatively, a diagnosis means may determine whether the knock signal output means is faulty based on a number of the time-varying patterns of vibration intensity which rise at a same time during a period in which an ignition noise is generated or an ignition noise is compulsorily generated. The ignition noise is a noise that is caused in one frequency range when the ignition timing is excessively retarded, so that when the ignition noise is caused, the knock is not caused. Therefore if the number of the time-varying patterns of vibration intensity is one, it is determined that the ignition noise is normally detected and the knock signal output means is normal. If the number of the time-varying patterns of vibration intensity is not one, it is determined that the ignition noise is not normally detected and the knock signal output means is faulty.

BRIEF DESCRIPTION OF THE DRAWINGS

Other objects, features and advantages of the present invention will become more apparent from the following description made with reference to the accompanying drawings, in which like parts are designated by like reference numbers and in which.

DETAILED DESCRIPTION OF EMBODIMENTS

Embodiments of the present invention will be described hereinafter.

First Embodiment

Figure 1:
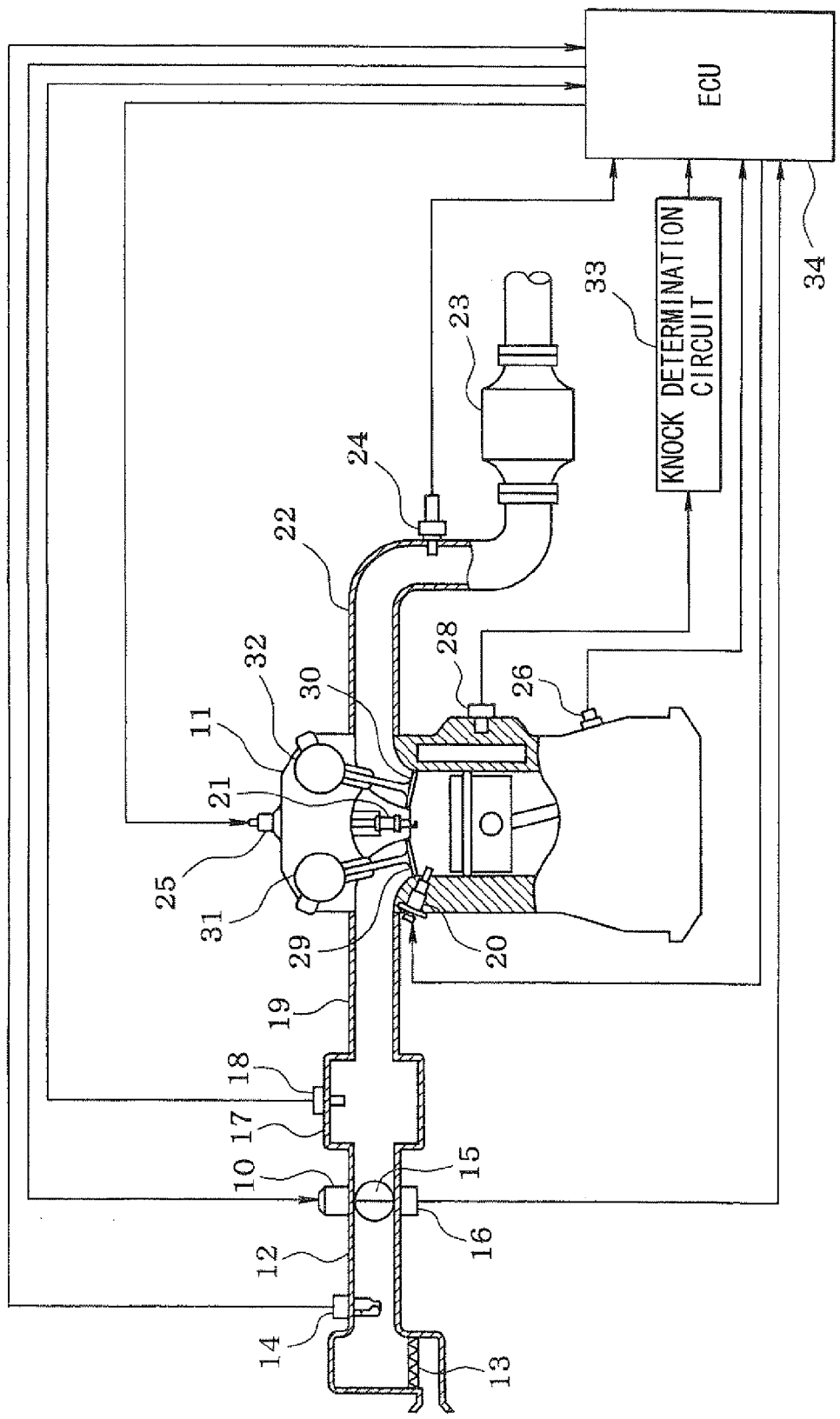
FIG. 1 is a schematic view of an engine control system according to a first embodiment of the present invention.
Figure 2:
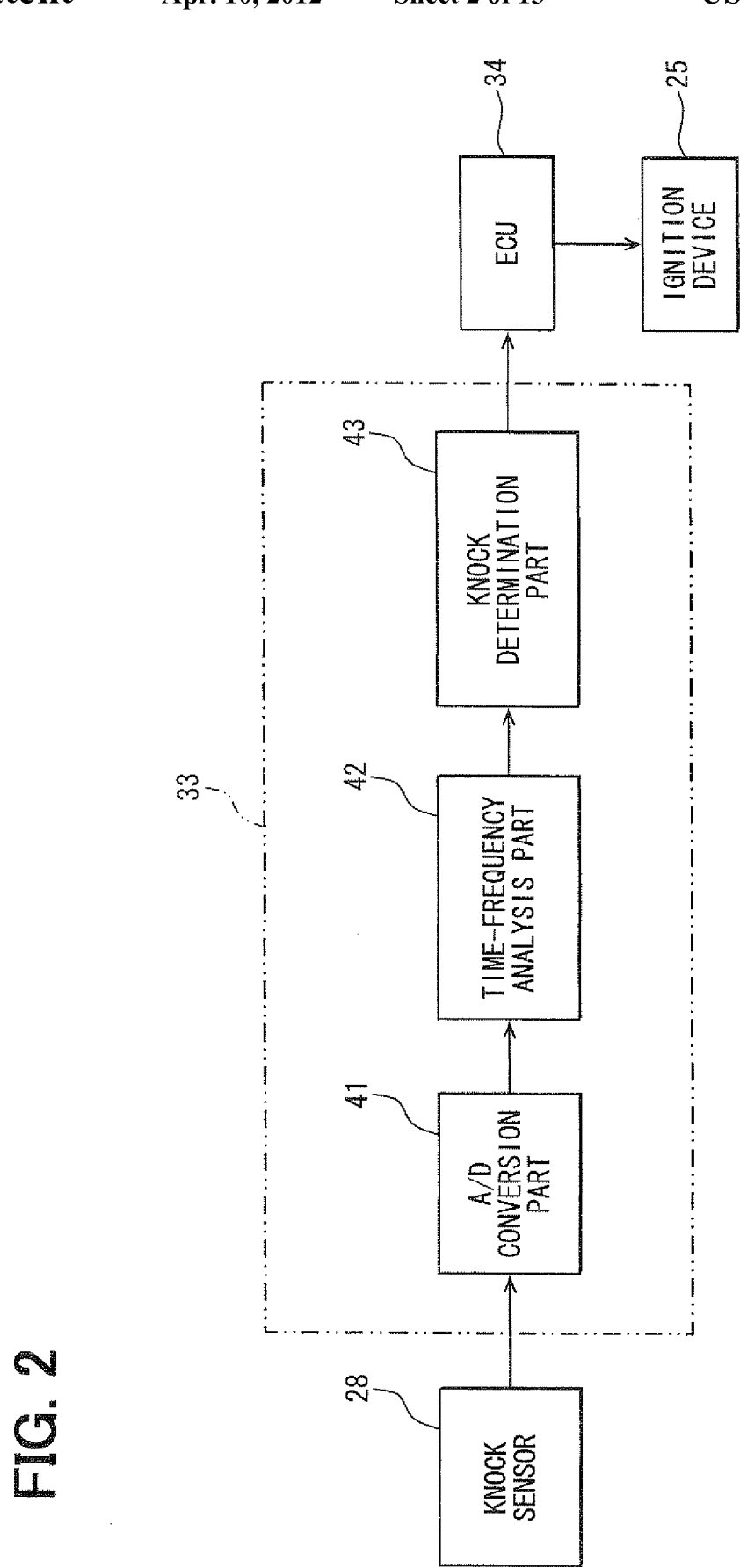
FIG. 2 is a block diagram showing a circuit for processing the output signal of a knock sensor to make a knock determination according to a first embodiment.

Referring to FIGS. 1 to 5, a first embodiment will be described hereinafter. Referring to FIG. 1, an engine control system is explained. An air cleaner 13 is arranged upstream of an intake pipe 12 of an internal combustion engine 11. An airflow meter 14 detecting an intake air flow rate is provided downstream of the air cleaner 13. A throttle valve 15 driven by a motor 10 and a throttle position sensor 16 detecting a throttle position are provided downstream of the air flow meter 14.

A surge tank 17 including an intake air pressure sensor 18 is provided downstream of the throttle valve 15. The intake air pressure sensor 18 detects intake air pressure. An intake manifold 19 is connected to the surge tank 17. A fuel injector 20 is mounted on each cylinder for injecting fuel into an interior of the cylinder respectively. A spark plug 21 is mounted on a cylinder head of the engine 11 corresponding to each cylinder. Each spark plug 21 receives high voltage generated by an ignition device 25 to ignite air-fuel mixture in each cylinder.

The engine 11 is provided with an intake valve timing controller 31 which adjusts a valve timing of the intake valve 29, and an exhaust valve timing controller 32 which adjusts valve timing of an exhaust valve 30.

An exhaust pipe 22 of the engine 11 is provided with a three-way catalyst 23 purifying CO, HC, NOx and the like in the exhaust gas. An exhaust gas sensor 24 detecting air-fuel ratio or rich/lean of the exhaust gas is disposed upstream of the three-way catalyst 25. A crank angle sensor 26 is installed on a cylinder block of the engine 11 to output crank angle pulses when a crank shaft rotates a predetermined angle. Based on these crank angle pulses of the crank angle sensor 26, a crank angle and an engine speed are detected.

The cylinder block of the engine 11 is mounted with a knock sensor 28 for detecting knock vibration, and the output signal of the knock sensor 28 is digitally processed by a knock determination circuit 33 to perform a knock determination. The knock sensor 28 corresponds to a knock signal output means. The knock determination result made by the knock determination circuit 33 is inputted to an electronic control unit 34, which is referred to as ECU 34, hereinafter. The ECU 34 includes a microcomputer which executes an engine control program stored in a Read Only Memory (ROM) to control a fuel injection quantity of the fuel injector 20, an ignition timing of the spark plug 21, and a valve timing of the variable valve timing controllers 31, 32. The ECU 34 repeatedly performs a following knock control so that an ignition timing comes close to a knock limit. That is, when the knock determination circuit 33 detects no knock, the ignition timing is advanced, whereas when the knock determination circuit 33 detects a knock, the ignition timing is retarded.

Figure 3:
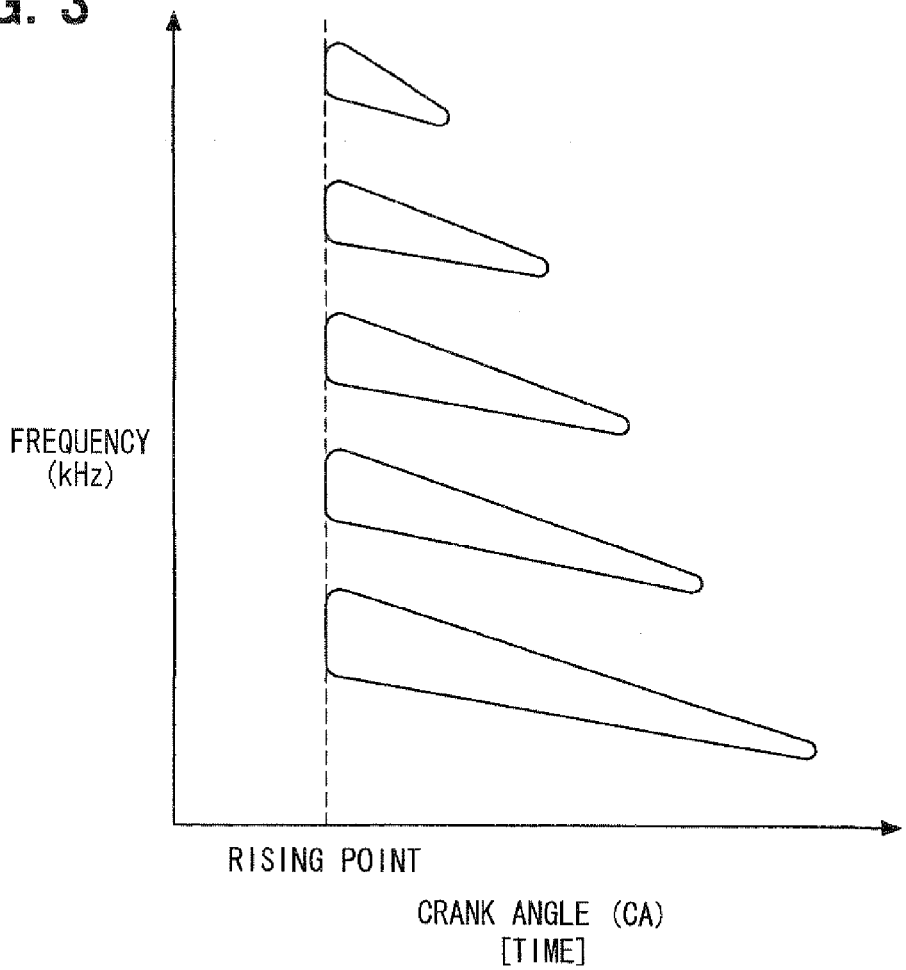
FIG. 3 is a graph schematically showing time-varying patterns of vibration intensity in multiple frequency ranges extracted from output signals of a knock sensor according to the first embodiment.
Figure 4:
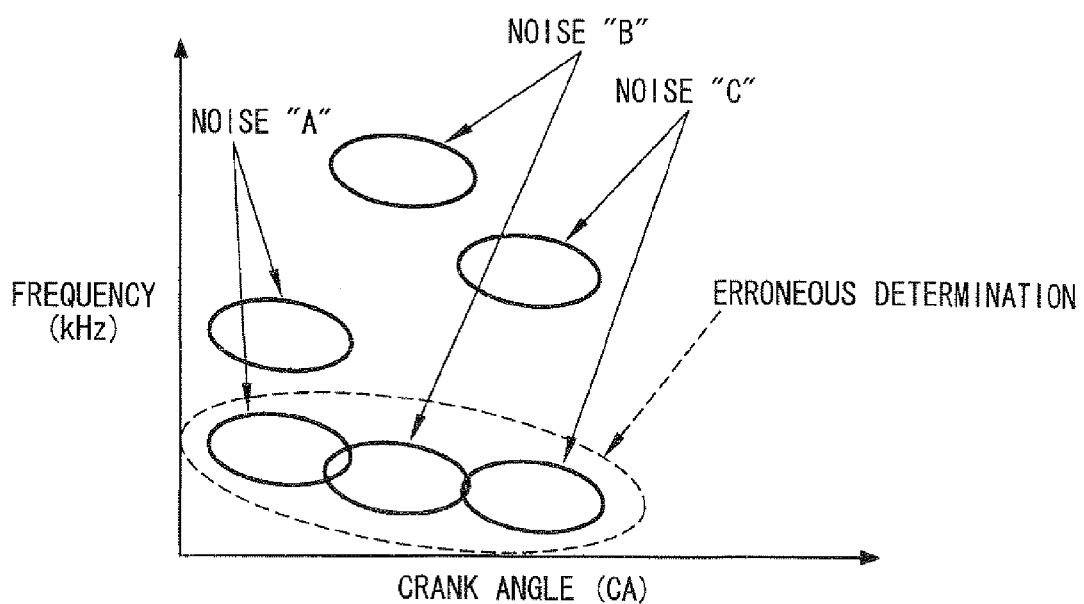
FIG. 4 is a graph showing an example in which when the time-varying pattern of vibration intensity is extracted from only one frequency range, an erroneous determination that knock is caused is made due to noises being superimposed on the output signal of the knock sensor.

As shown in FIG. 3, when knock is caused, not only a knock vibration component in the basic frequency of the knock (first-order resonance frequency determined by the diameter of the bore of the cylinder) but also knock vibration components in a plurality of higher-order resonance frequency ranges develop at the same time. When the knock is caused, the low frequency shift occurs. That is, the vibration components of these plural frequency ranges gradually shift to a lower frequency side. As shown in FIG. 4, when a plurality of noises are superimposed on the output signal of the knock sensor 28 in time sequence within one knock determination range, there is a possibility of making an erroneous determination that one continuous vibration component will apparently causes a low frequency shift. Thus, when it is only determined whether a vibration component of one frequency range causes a low frequency shift, there is a possibility of making an erroneous knock determination.

A noise generated by a single vibration, such as a valve seating noise or a direct-injection injector noise, does not continue for a long period like a knock vibration. However, there is a noise continuing for a long period in a specified frequency like a piston slap noise generated due to a piston sliding on a cylinder inner wall. Such a noise continuing for a long time in a specified frequency may cause an erroneous knock determination.

When a knock is caused, vibrations in multiple frequency ranges rise at the same time. Based on this phenomenon, the time-varying patterns of vibration intensity in multiple frequency ranges are extracted from the output signal of the knock sensor 28, and a knock determination is executed based on the number of the time-varying patters of vibration intensity, which rise at a same time.

In the present first embodiment, a time-frequency analysis is used to extract the time-varying patterns of vibration intensity in multiple frequency ranges from the output signals of the knock sensor 28. A short-time Fourier transform (STFT), a wavelet transform, a Wigner distribution, or the like is used as the time-frequency analysis.

The processing of the time-frequency analysis is performed by a time-frequency analysis part 42 in the knock determination circuit 33. The time-frequency analysis part 42 corresponds to a vibration intensity extraction means. The output signal of the knock sensor 28 is converted to a digital value by an A/D conversion part 41. The converted signal is processed by the time-frequency analysis part 42. When a knock is caused, as shown in FIG. 3, the time-varying patterns are extracted in multiple frequency ranges. The frequency ranges in which the time-varying pattern of vibration intensity is extracted include a range of a basic frequency, which is the lowest frequency of the frequencies of the knock vibrations, and a plurality of ranges of higher-order resonance frequencies of the knock vibrations. The basic frequency is the first-order resonance frequency determined by the diameter of the bore of the cylinder Based on the analysis result of the time-frequency analysis part 42, a knock determination part 43 computes the number of the time-varying patters of vibration intensity, which rise at a same time. Then, the knock determination part 43 executes a knock determination based on whether the number of the time-varying patterns of vibration intensity is greater than a knock determination threshold.

Figure 5:
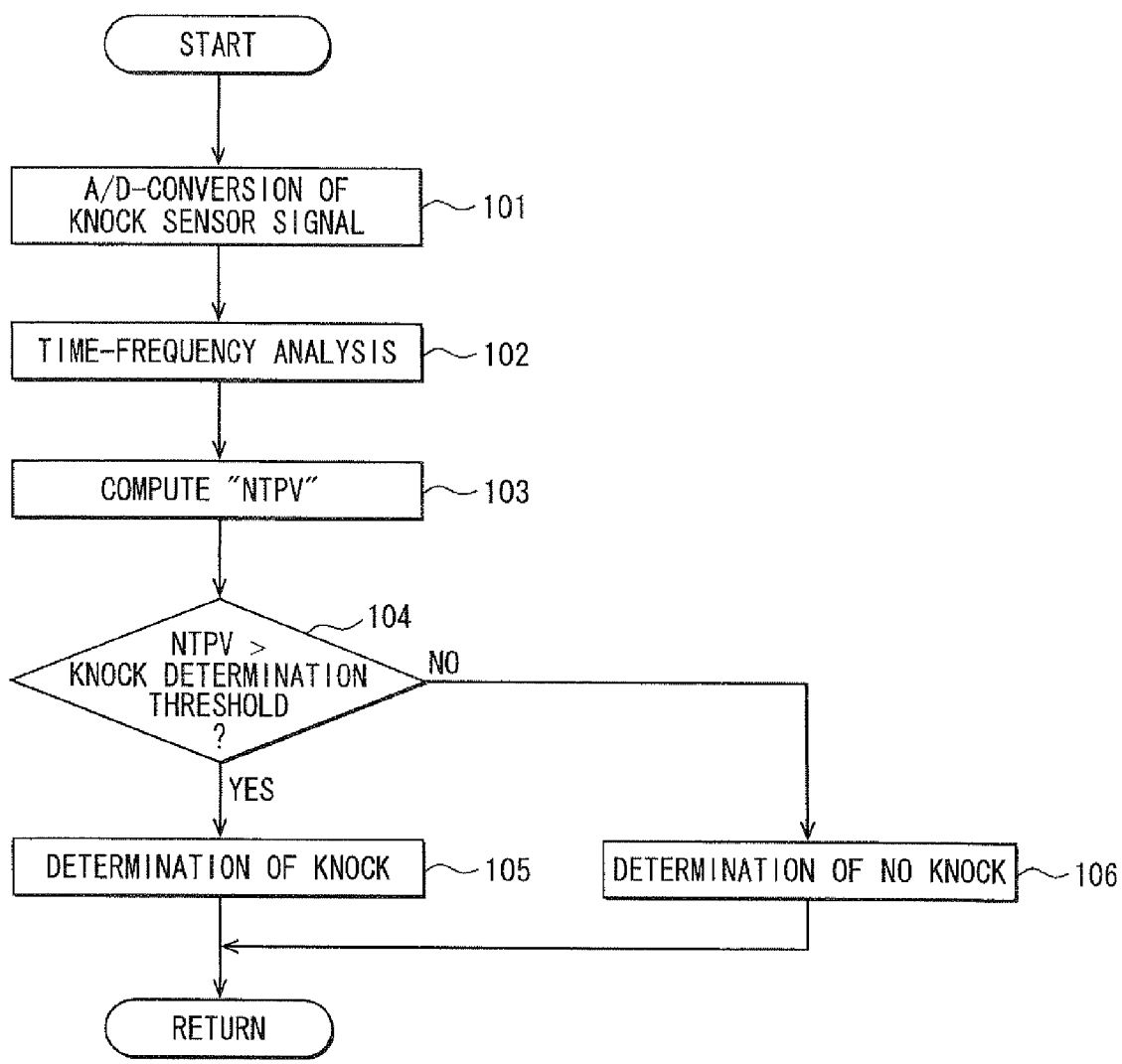
FIG. 5 is a flow chart showing a processing of a knock determination routine according to a first embodiment.

The above-mentioned knock determination processing is performed by the knock determination circuit 33 according to a knock determination routine shown in FIG. 5. The knock determination routine shown in FIG. 5 is performed for each one ignition of each cylinder. In step 101, the output signal of the knock sensor 28 is converted by the A/D conversion part 41 to a digital signal in a specified knock determination range. In step 102, the time-frequency analysis (STFT, wavelet transform, Wigner distribution, or the like) is performed to extract the data of frequency, time, and vibration intensity at the same time from the output signal of the knock sensor 28, thereby extracting the time-varying patterns of vibration intensity in the multiple frequency ranges.

Then, the procedure proceeds to step 103 in which the knock determination part 43 computes the number of the time-varying patterns of vibration intensity, which rise at the same time. The number of the time-varying patterns of vibration intensity which rise at the same time is referred to as NTPV hereinafter. In step 104, it is determined whether the NTPV is greater than the knock determination threshold, for example, two or three. When the NTPV is larger than the determination threshold value the routine proceeds to Step S105 in which it is determined that the knock is caused. When the NTPV is not larger than the determination threshold value, the routine proceeds to Step S106 in which it is determined that no knock is caused. With this manner, even if a low frequency shift or a piston slap noise that cannot be distinguished from the knock in any one of the frequency ranges is developed due the noises being superimposed on the output signal of the knock sensor 28, it is possible to prevent making an erroneous determination that the low frequency shift developed by the noises is the knock. Thus, the knock determination accuracy is enhanced.

Second Embodiment

Figure 6:
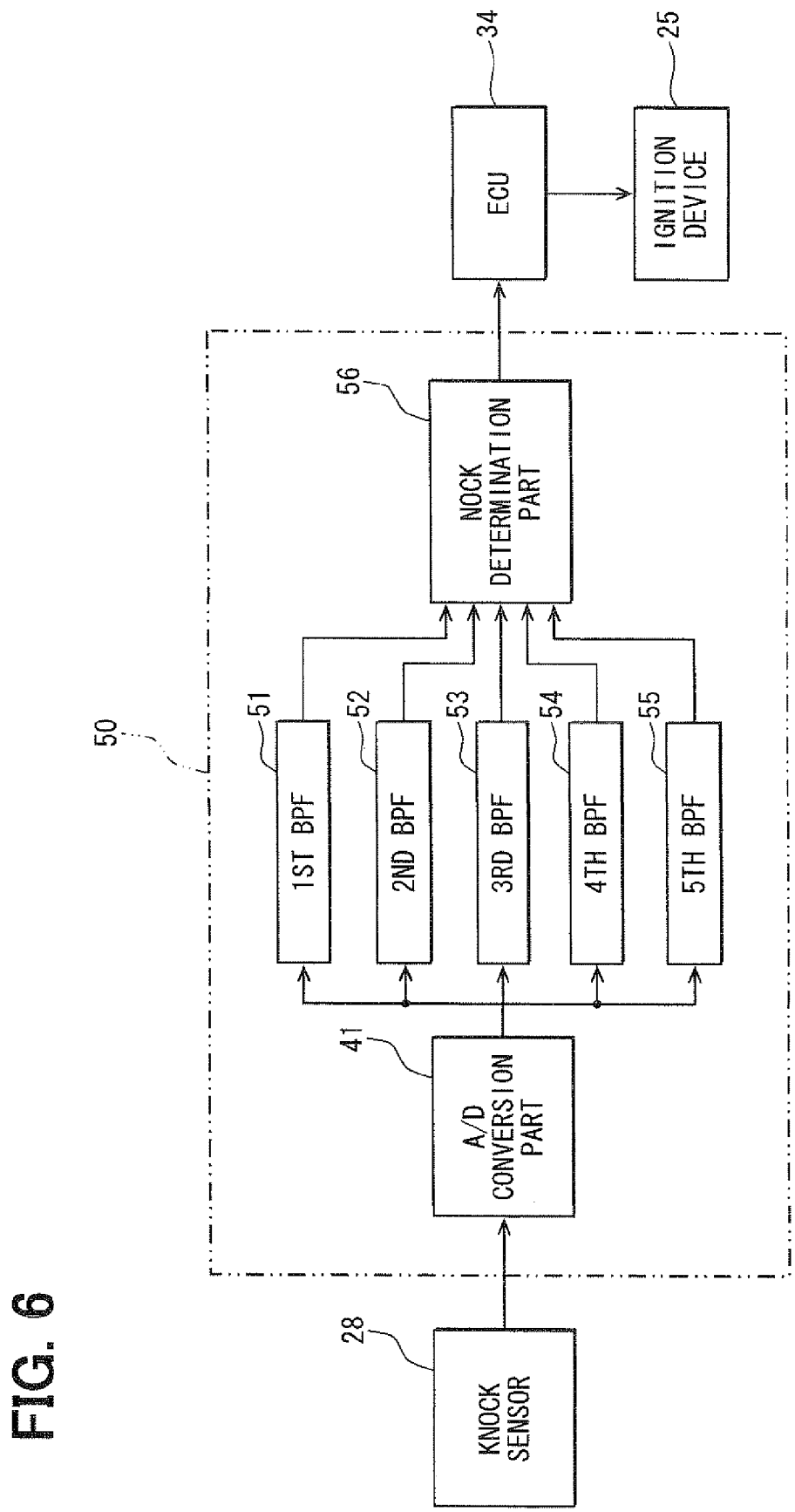
FIG. 6 is a block diagram showing a circuit for processing the output signal of a knock sensor to make a knock determination according to a second embodiment.
Figure 7:
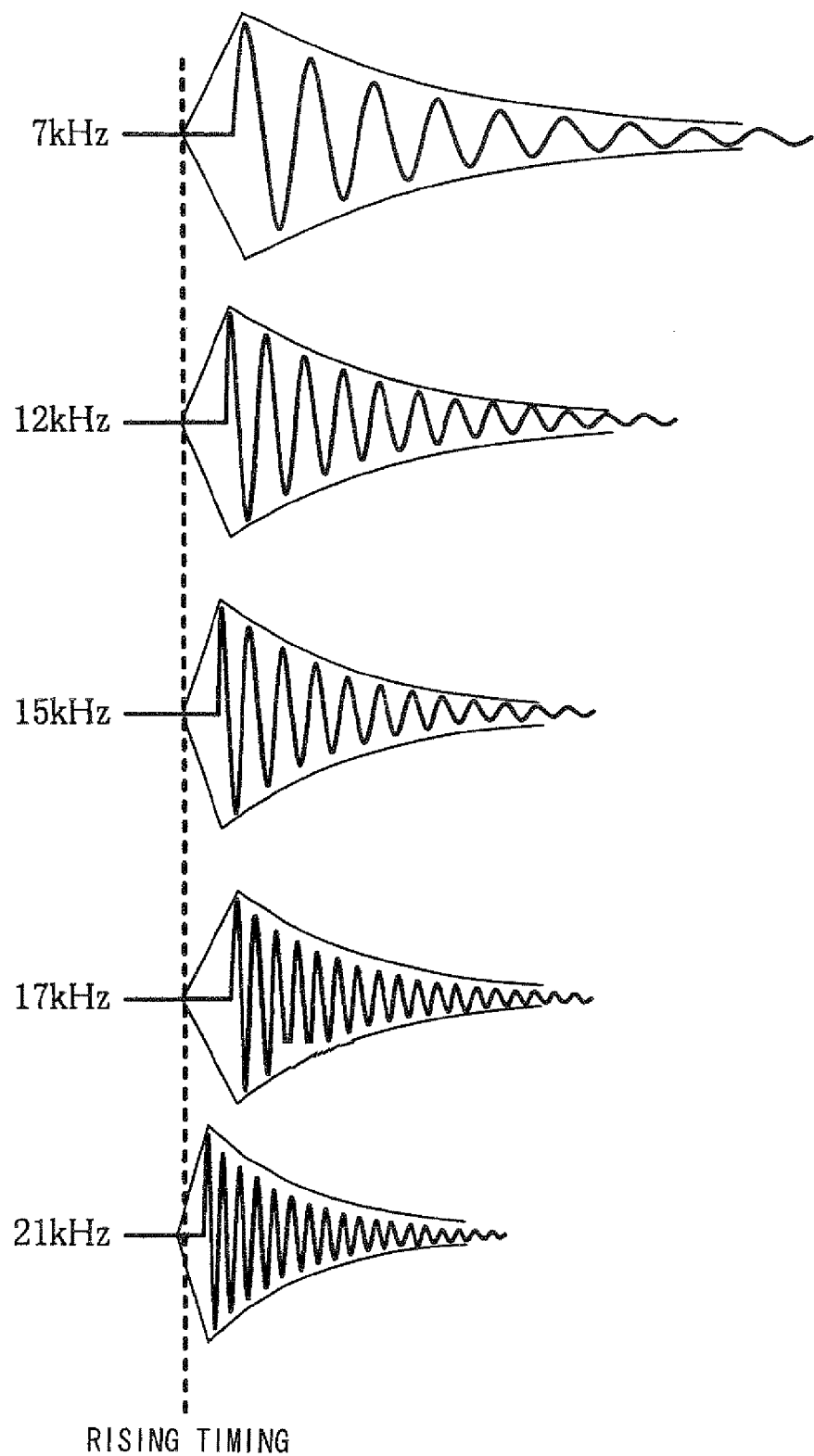
FIG. 7 is a time chart showing vibration waveforms which are processed by band-pass filters according to the second and a fifth embodiment.
Figure 8:
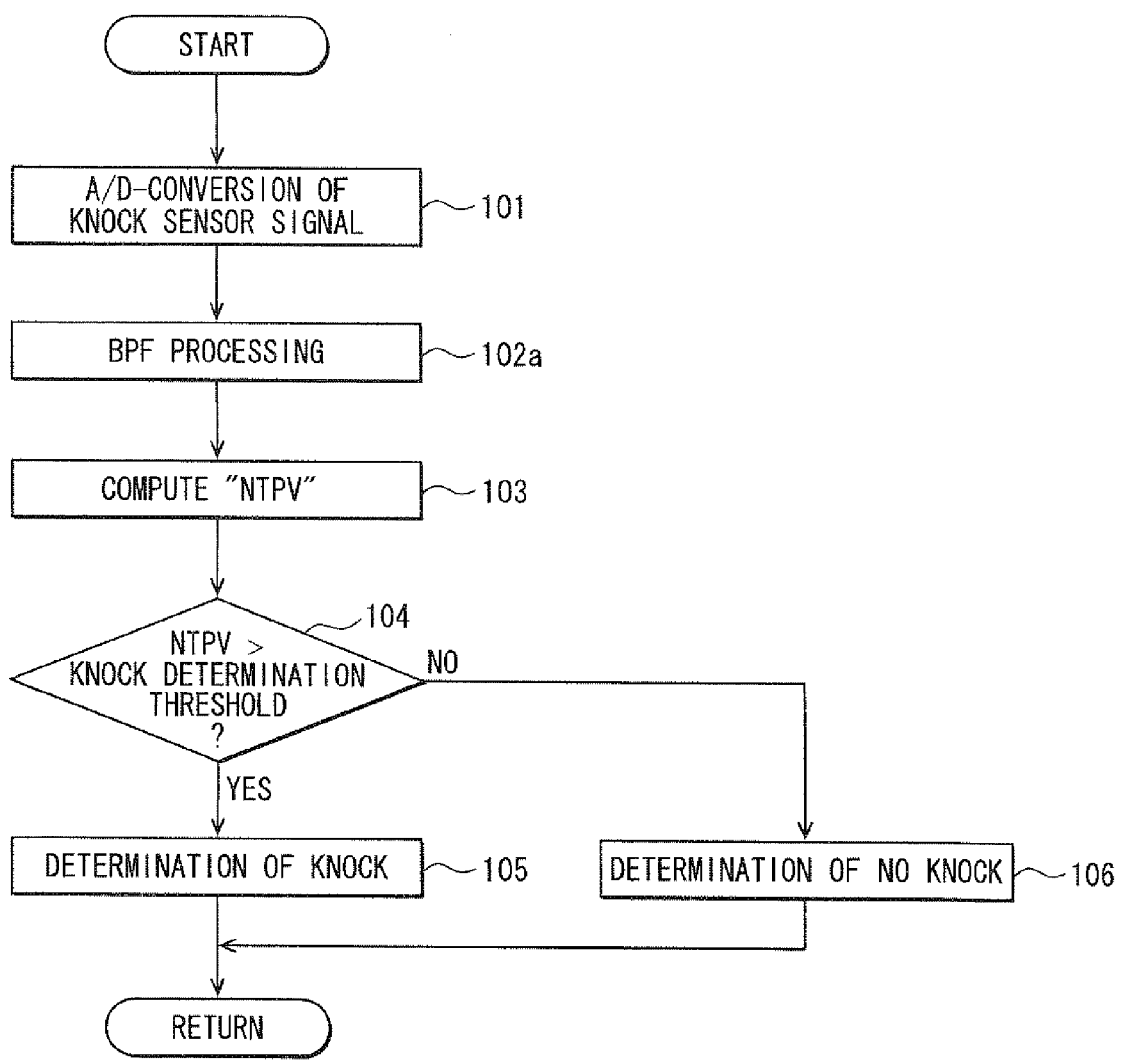
FIG. 8 is a flow chart showing a processing of a knock determination routine according to a second embodiment.
Figure 9:
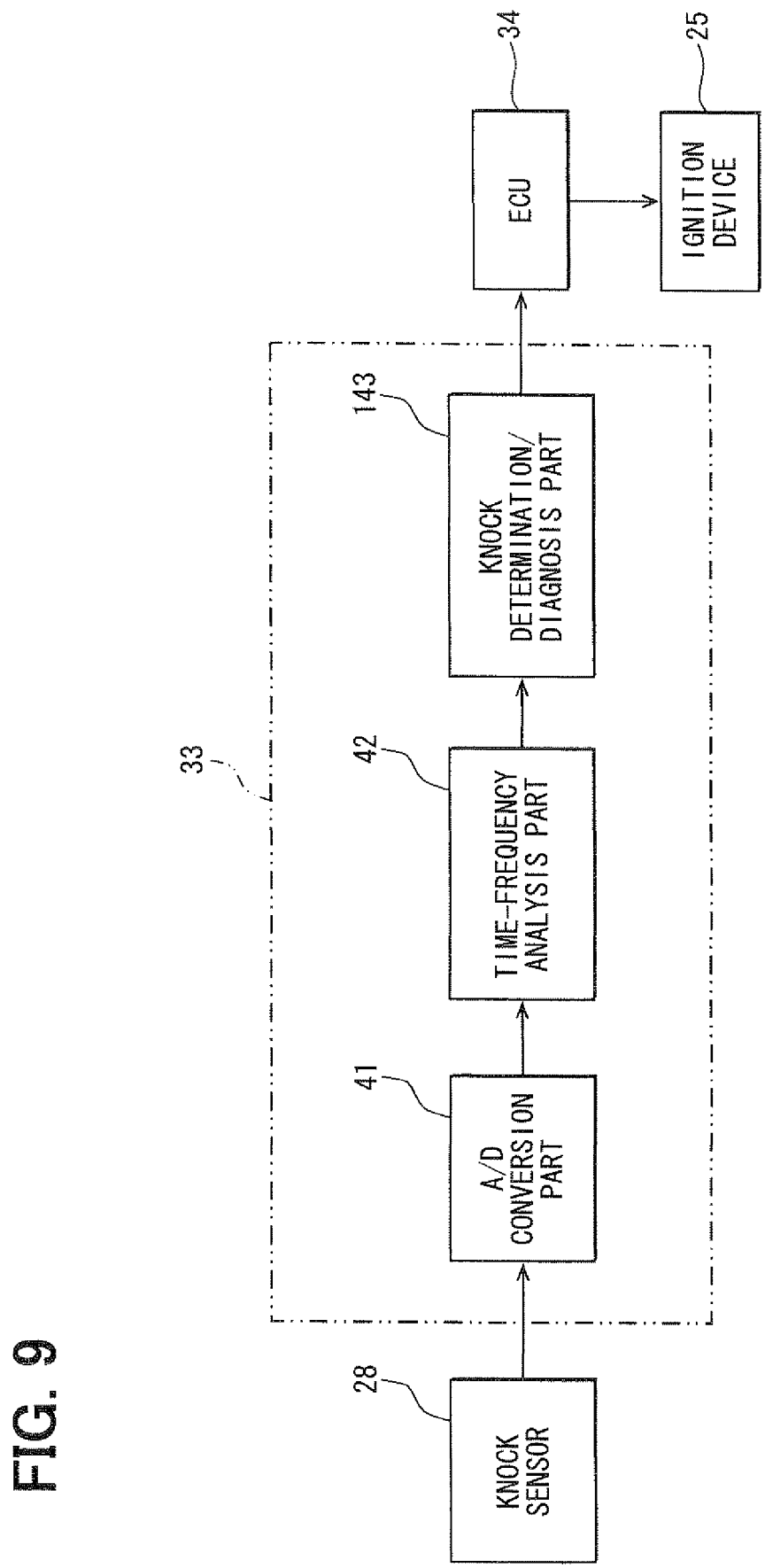
FIG. 9 is a block diagram showing a circuit for processing the output signal of a knock sensor to make a knock determination according to a third embodiment.

In a second embodiment shown in FIGS. 6 to 8, a knock determination circuit 50 is provided with multiple band pass filters (a first BPF 51 to a fifth BPF 55) for extracting the time-varying patterns of vibration intensity in multiple frequency ranges from the output signal of the knock sensor 28, which is converted to a digital value by the AD conversion part 41. The knock determination pad 56 executes a knock determination based on whether the NTPV is greater than the knock determination threshold.

The frequency ranges extracted by the first BPF 51 to the fifth BPF 55 are a first-order frequency range (basic frequency band of knock vibration) and multiple higher-order frequency ranges. The first-order frequency range (pass band of the first BPF 51) is set to a frequency range including a basic frequency that is the lowest frequency of the frequencies of the knock vibration. The basic frequency is a first-order resonance frequency determined by the diameter of the bore of the cylinder, for example, approximately 7 kHz. As shown in FIG. 7, the multiple higher-order frequency ranges (pass bands of the respective second to fifth BPF 52 to 55) are set to frequency ranges of approximately, for example, 12 kHz, 15 kHz, 17 kHz, and 21 kHz. The number of the BPF 51 to 55 is not limited to five but may be three, four, or six or more.

The above-mentioned knock determination processing is performed by the knock determination circuit 50 according to a knock determination routine shown in FIG. 8. The knock determination routine shown in FIG. 8 is different from the knock determination routine shown in FIG. 5 only in that the processing in step 102 in FIG. 5 is replaced by processing in step 102*a*. The other steps in FIG. 8 are the same as those in FIG. 5.

In step 101, the output signal of the knock sensor 28 is converted by the A/D conversion part 41 to a digital signal in a specified knock determination range. In step 102*a*, the output signals of the knock sensor 28 are processed by the first BPF 51 to the fifth BPF 55 to extract the time-varying patterns of vibration intensity in the multiple frequency ranges, as shown in FIG. 7. Then, the procedure proceeds to step 103 in which the knock determination part 43 computes the NTPV. Then, the procedure proceeds to step 104 in which the NTPV is compared with the knock determination threshold. When the NTPV is greater than the knock determination threshold, the procedure proceeds to step 105 in which it is determined that the knock is caused. When the NTPV is not greater than the knock determination threshold, the procedure proceeds to step 106 in which it is determined that no knock is caused.

According to the second embodiment, the same advantage can be achieved as the first embodiment.

Third Embodiment

As shown in FIG. 3, when knock is caused, not only a knock vibration component in the basic frequency of the knock (first-order resonance frequency determined by the diameter of the bore of the cylinder) but also knock vibration components in a plurality of higher-order resonance frequency ranges develop at the same time. In the third embodiment, when a knock is caused, the vibrations rise at the same time in at least three frequency ranges. Based on this phenomenon, the time-varying patterns of vibration intensity in multiple frequency ranges are extracted from the output signal of the knock sensor 28, and a knock determination is executed based on whether the NTPV is greater than or equal to three.

Furthermore, according to the third embodiment, while the engine 11 is operated in a condition where a knock is caused, or while an ignition timing is advanced to compulsorily generate a knock, a diagnosis of the knock sensor 28 is executed based on whether the NTPV is less than three.

In the present third embodiment, a time-frequency analysis is used to extract the time-varying patterns of vibration intensity in multiple frequency ranges from the output signals of the knock sensor 28. A short-time Fourier transform (STFT), a wavelet transform, a Wigner distribution, or the like is used as the time-frequency analysis.

The processing of the time-frequency analysis is performed by a time-frequency analysis part 42 in the knock determination circuit 33. The time-frequency analysis part 42 corresponds to a vibration intensity extraction means. The output signal of the knock sensor 28 is converted to a digital value by an A/D conversion part 41. The converted signal is processed by the time-frequency analysis part 42. When a knock is caused, as shown in FIG. 3, time-varying patterns are extracted in the multiple frequency ranges. The frequency ranges in which the time-varying pattern of vibration intensity is extracted include a range of a basic frequency, which is the lowest frequency of the frequencies of the knock vibrations, and a plurality of ranges of higher-order resonance frequencies of the knock vibrations. The basic frequency is the first-order resonance frequency determined by the diameter of the bore of the cylinder Based on the analysis result of the time-frequency analysis part 42, a knock determination/diagnosis part 143 computes the NTPV and executes the diagnosis of the knock sensor 28 based on whether the NTPV is less than a determination threshold, for example, three.

Figure 10:
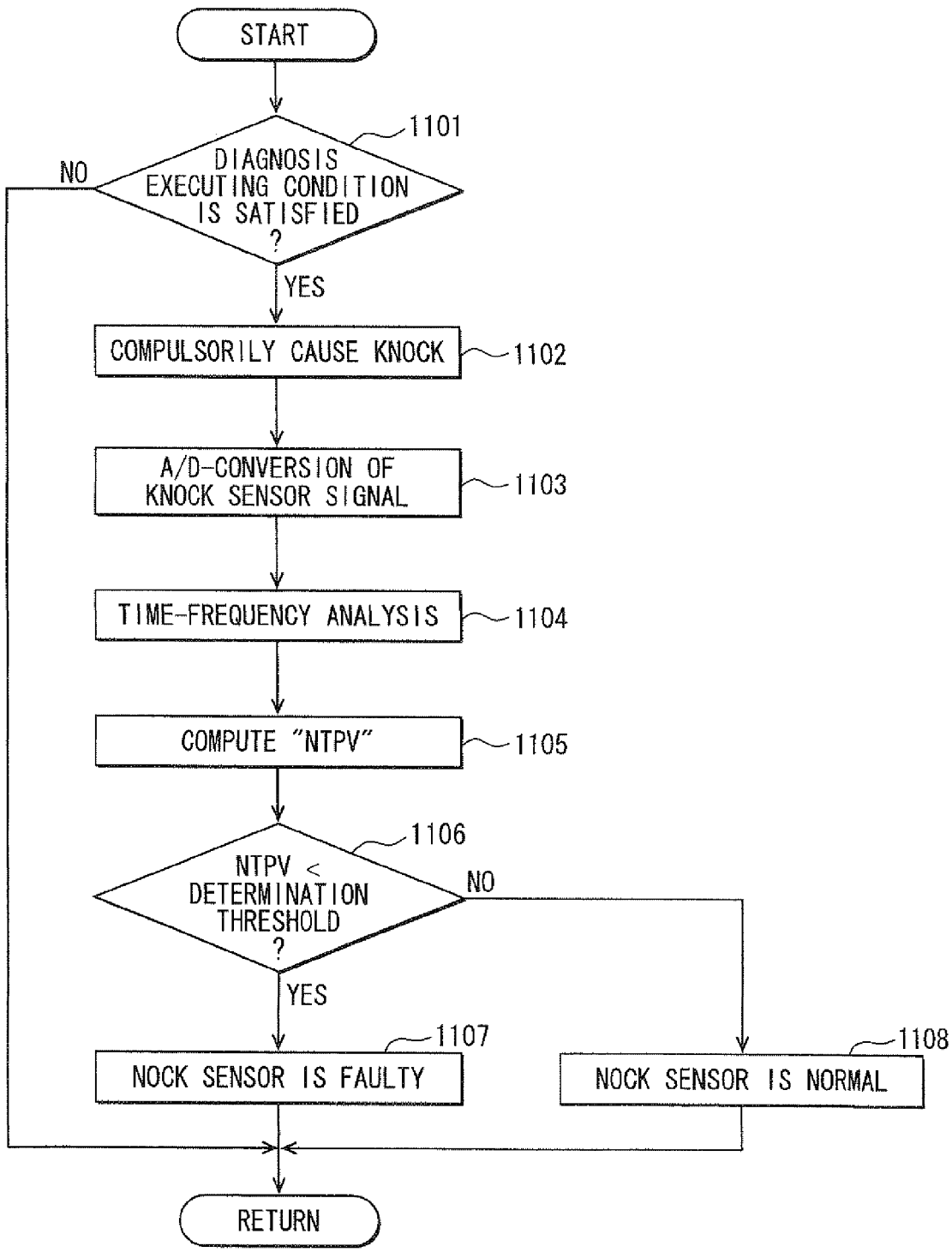
FIG. 10 is a flow chart showing a processing of a diagnosis routine according to a third embodiment.

The above-mentioned abnormality diagnosis processing of the knock sensor 28 is performed by the knock determination/diagnosis part 143 according to a diagnosis routine shown in FIG. 10. The diagnosis routine shown in FIG. 10 is performed for each one ignition of each cylinder and functions as a diagnosis means. In Step S1101, it is determined whether a diagnosis executing condition is satisfied. This diagnosis executing condition includes, for example, (1) a faulty in an ignition system or the like is not detected by the other diagnosis function, and (2) the engine is in an operating state suitable for performing a diagnosis (for example, steady operating state). If the diagnosis executing condition is not satisfied, this routine is finished without performing the subsequent steps.

If the diagnosis executing condition is satisfied, the procedure proceeds to Step S1102 in which the ignition timing is advanced to compulsorily cause the knock. Alternatively, the routine may wait until the operating condition in which the knock is caused is satisfied.

Then, the procedure proceeds to Step S1103 in which the output signal of the knock sensor 28 is converted to a digital signal by the A/D conversion part 41. In Step S1104, the time-frequency analysis (STFT, wavelet transform, Wigner transform) is performed to extract the data of frequency, time, and vibration intensity at the same time from the output signal of the knock sensor 28, thereby extracting the time-varying patterns of vibration intensity in multiple frequency ranges.

Then, the procedure proceeds to step 1105 in which the knock determination/diagnosis part 143 computes the NTPV. In step 1106, it is determined whether the NTPV is less than the determination threshold, for example, three. When the NTPV is less than the determination threshold, the knock sensor 28 is in a state where the knock sensor 28 cannot detect a knock actually caused. The procedure proceeds to step 1107 in which it is determined that the knock sensor 28 is faulty. When the answer is No in step 1106, the knock sensor 28 can normally detect a knock actually caused, so that the procedure proceeds to Step S1108 in which it is determined that the knock sensor 28 is normal.

According to the third embodiment, a diagnosis of the knock sensor 28 can be executed based on whether the NTPV is less than the determination threshold while an ignition timing is advanced to compulsorily cause a knock or while the engine is operated in a condition where a knock is caused.

Fourth Embodiment

Figure 11:
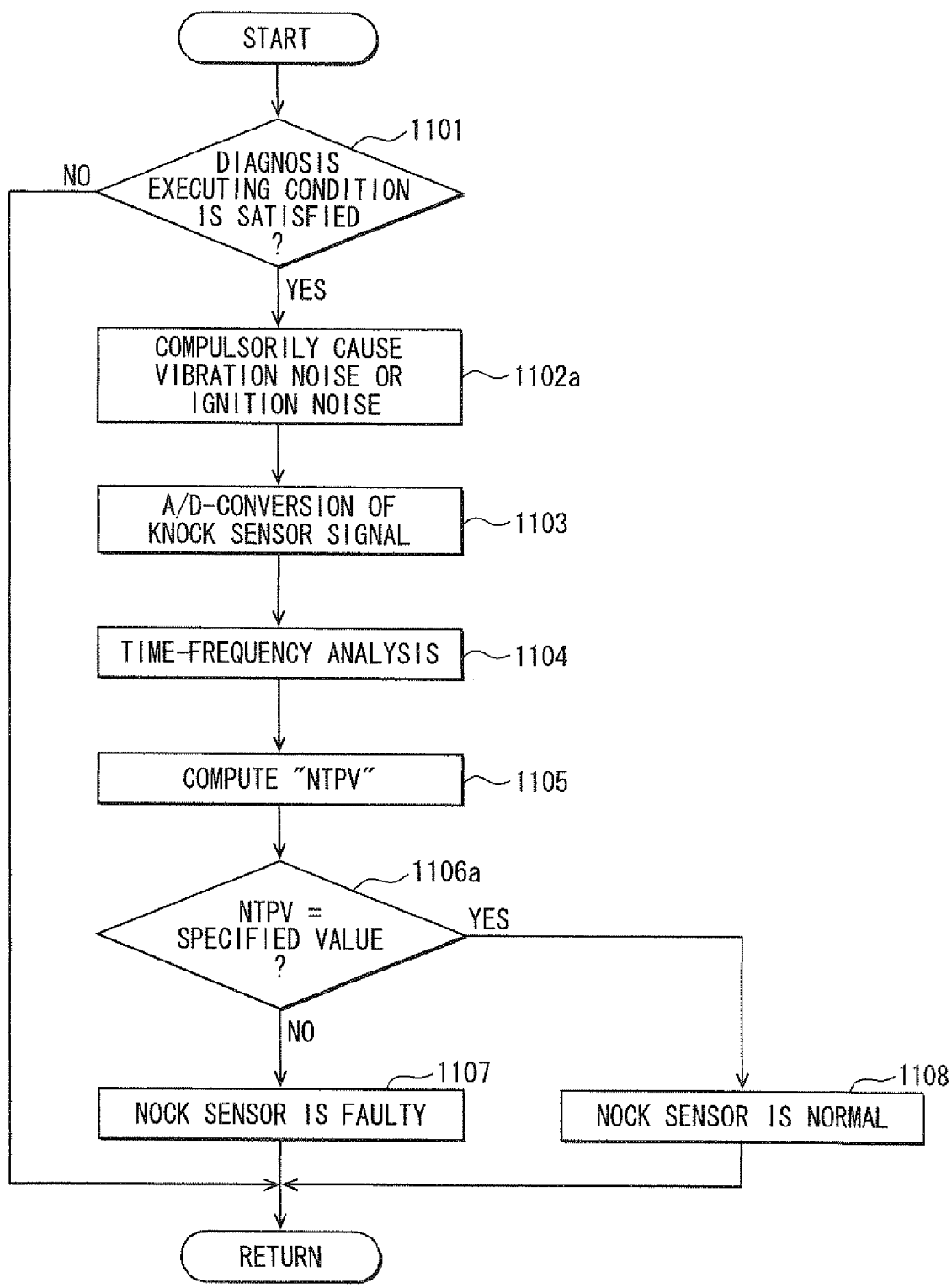
FIG. 11 is a flow chart showing a processing of a diagnosis routine according to a fourth embodiment.

In a fourth embodiment of the present invention, by performing a diagnosis routine shown in FIG. 11, a determination is made as to whether the knock sensor 28 is faulty based on whether the NTPV is equal to the number of noise which rises at the same time during a period in which noise (vibration noise or ignition noise) is caused or during a period in which the noise is compulsorily caused.

The vibration noise includes, for example, a noise caused when the valve is seated, and a noise caused when the injector directly injects fuel. These vibration noises are characterized in that vibration rises in two frequency ranges at the same timing. Therefore, during a period in which the vibration noise is caused or the vibration noise is compulsorily caused, if the NTPV is two, the vibration noise is normally detected. Thus, it is determined that the knock sensor 28 is normal. If the NTPV is not two, the vibration noise is not normally detected. Thus, it is determined that the knock sensor 28 is faulty.

The ignition noise is a noise that is caused in one frequency range when the ignition timing is excessively retarded, so that when the ignition noise is caused, the knock is not caused. Therefore if the NTPV is one, the ignition noise is normally detected and it is determined that the knock sensor 28 is normal. If the NTPV is not one, the ignition noise is not normally detected and it is determined that the knock sensor 28 is faulty.

The abnormality diagnosis routine shown in FIG. 11, which is performed in the fourth embodiment, is different from the diagnosis routine shown in FIG. 10 only in that the processings in steps S1102, S1106 in FIG. 10 are replaced by processings in steps S1102a, S1106a. The other steps in FIG. 11 are the same as those in FIG. 10.

In the diagnosis routine shown in FIG. 11, when a diagnosis executing condition is satisfied, the procedure proceeds to step 1102a in which a noise, such as a vibration noise or an ignition noise, is compulsorily caused. Alternatively, the routine may wait until a condition in which the noise, such as the vibration noise or the ignition noise, is caused is satisfied.

In steps 1103 to 1105, the knock determination/diagnosis part 143 computes the NTPV. In step 1106a, it is determined whether the NTPV is equal to a specified value, for example, two or one. When the answer is Yes in step 1106a, it is determined that the noise such as a vibration noise or an ignition noise is normally detected. The procedure proceeds to step 1108 in which it is determined that the knock sensor 28 is normal.

When the answer is No in step 1106a, it is determined that the noise such as a vibration noise or an ignition noise is not normally detected. The procedure proceeds to step 1107 in which it is determined that the knock sensor 28 is faulty.

Also in the fourth embodiment described above, the same advantage as those in the third embodiment can be obtained. The ignition timing may be retarded during the diagnosis of the knock sensor 28 in order to prevent causing the knock. With this, the diagnosis of the knock sensor 28 can be performed under a condition where only vibration noise is caused without any knock, so that it is possible to enhance the accuracy of diagnosis of the knock sensor 28.

Fifth Embodiment

Figure 12:
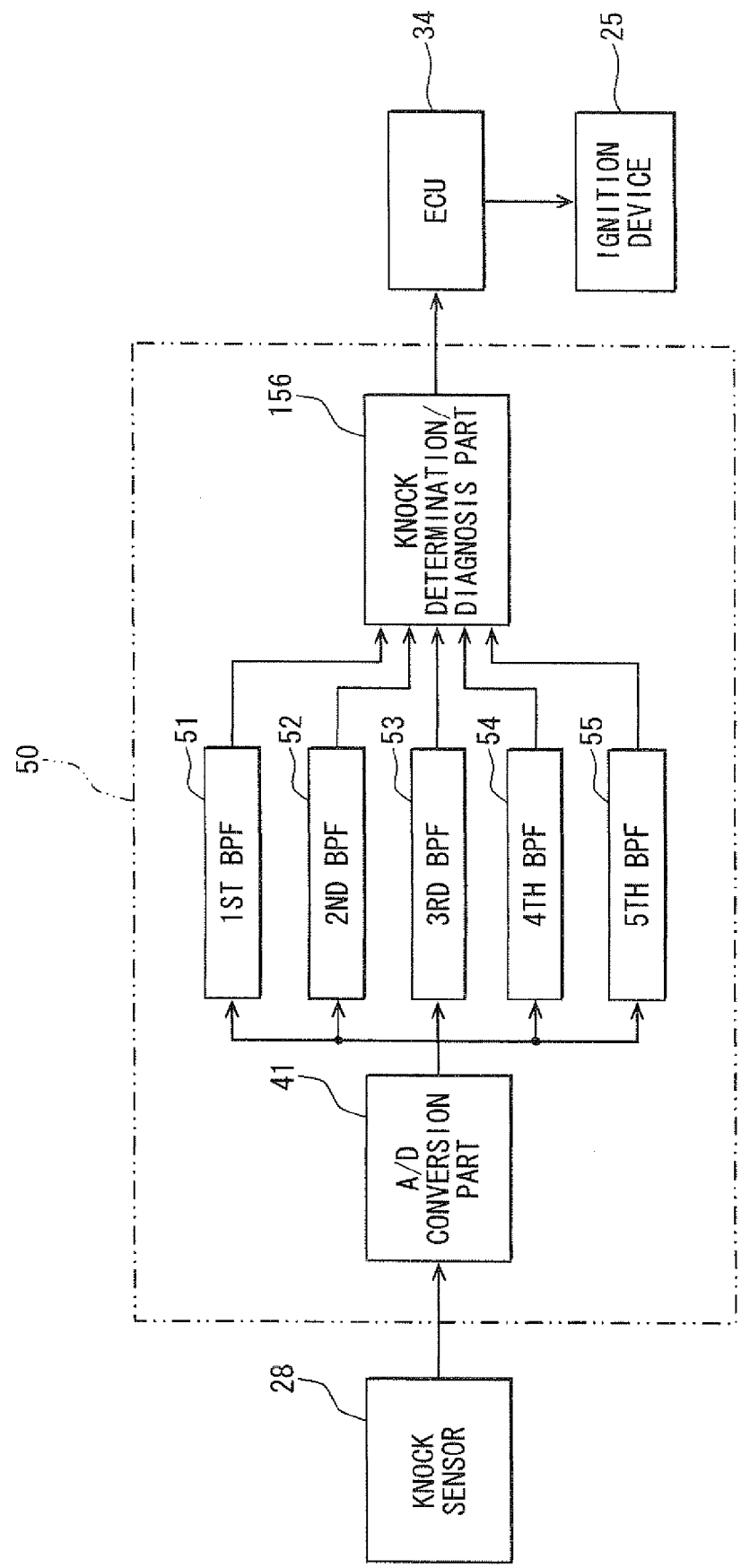
FIG. 12 is a block diagram showing a circuit for processing the output signal of a knock sensor to make a knock determination according to a fifth embodiment.
Figure 13:
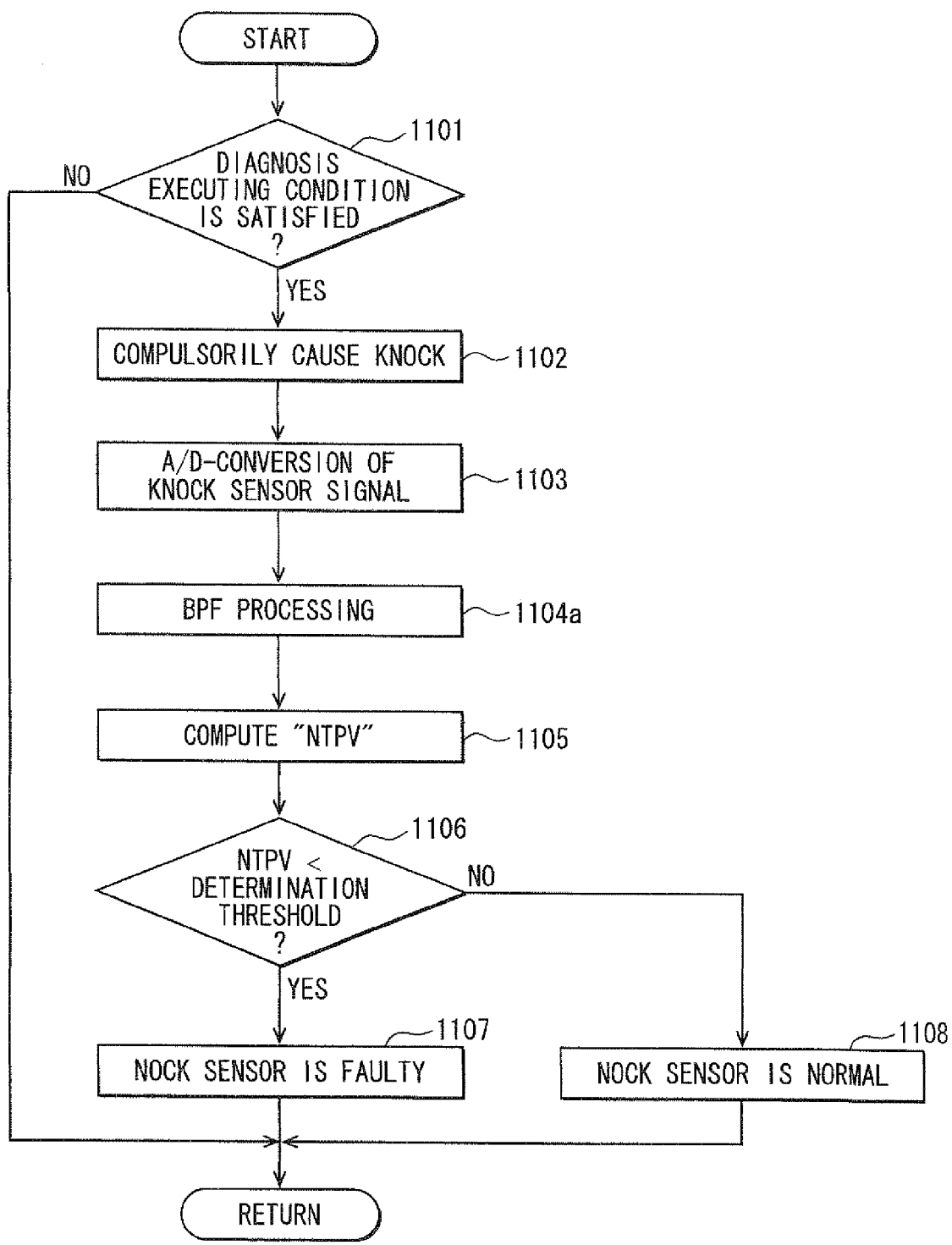
FIG. 13 is a flow chart showing a processing of a diagnosis routine according to a fifth embodiment.

In a fifth embodiment shown in FIGS. 12 and 13, a knock determination circuit 50 is provided with multiple band pass filters (a first BPF 51 to a fifth BPF 55) for extracting the time-varying patterns of vibration intensities in the multiple frequency ranges from the output signal of the knock sensor 28, which is converted to a digital value by the AD conversion part 41. A knock determination/diagnosis part (abnormality diagnosis means) 156 determines whether the knock sensor 28 is faulty based on whether the NTPV is less than a determination threshold.

The frequency ranges extracted by the first BPF 51 to the fifth BPF 55 are a first-order frequency range (basic frequency band of knock vibration) and multiple higher-order frequency ranges. The first-order frequency range (pass band of the first BPF 51) is set to a frequency range including a basic frequency that is the lowest frequency of the frequencies of the knock vibration. The basic frequency is a first-order resonance frequency determined by the diameter of the bore of the cylinder, for example, approximately 7 kHz. As shown in FIG. 7, the multiple higher-order frequency ranges (pass bands of the second to fifth BPF 52 to 55) are set to frequency ranges of approximately, for example, 12 kHz, 15 kHz, 17 kHz, and 21 kHz. The number of the BPF 51 to 55 is not limited to five but may be three, four, or six or more.

The above-mentioned diagnosis processing of the knock sensor 28 is performed by the knock determination/diagnosis part 156 according to a diagnosis routine shown in FIG. 13. The diagnosis routine shown in FIG. 13 is different from the diagnosis routine shown in FIG. 10 only in that the processing in step 1104 in FIG. 10 is replaced by processing in step 1104a. The other steps in FIG. 13 are the same as those in FIG. 10.

During a period in which a knock is compulsorily caused, the output signal of the knock sensor 28 is converted to a digital signal by the A/D conversion part 41 in step 1103. Then, in step 1104a, the output signals of the knock sensor 28 are processed by the first BPF 51 to the fifth BPF 55 to extract the time-varying patterns of vibration intensity in the multiple frequency ranges, as shown in FIG. 7. Then, the procedure proceeds to step 1105 in which the knock determination/diagnosis part 143 computes the NTPV. Then, the procedure proceeds to step 1106 in which the NTPV is compared with the determination threshold. When the NTPV is greater than or equal to the determination threshold, the procedure proceeds to step 1107 in which it is determined that the knock sensor is faulty. When the NTPV is not greater than the determination threshold, the procedure proceeds to step 1108 in which it is determined that the knock sensor is normal.

Also in the fifth embodiment described above, the same advantage as those in the third embodiment can be obtained.

Sixth Embodiment

Figure 14:
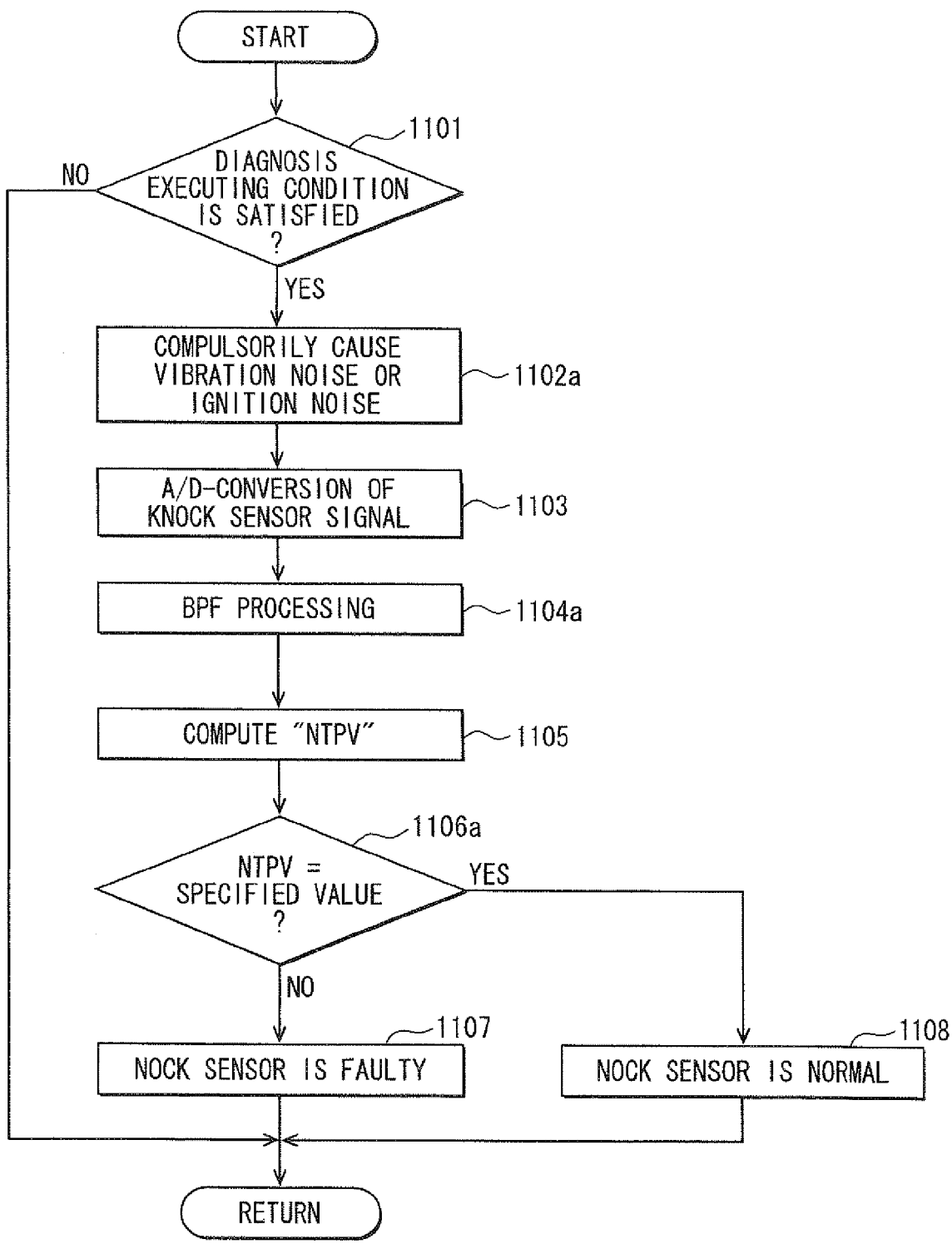
FIG. 14 is a flow chart showing a processing of a diagnosis routine according to a sixth embodiment.

In a sixth embodiment shown in FIG. 14, the output signals of the knock sensor 28 which are AD-converted are processed by the first to the fifth BPF 51 to 55 so that the time-varying patterns of vibration intensity in multiple frequency ranges are extracted (step 1104a). In steps 1105 to 1108, a diagnosis of the knock sensor 28 is executed based on whether the NTPV is equal to the specified value.

Also in the sixth embodiment described above, the same advantage as those in the third embodiment can be obtained.

In the above embodiments, the knock sensor 28 is used as the knock signal output means of which output signal waveform is varied according to the knock caused during the engine operation. Alternatively, a cylinder pressure sensor for detecting a cylinder pressure or an ion current detection means for detecting ions produced by the combustion of the air-fuel mixture in the cylinder through the ignition plug 21 or the like may be used as the knock signal output means.

The present invention is not limited to a direct injection engine shown in FIG. 1 but can be applied also to an intake port injection engine and a dual injection engine having fuel injectors mounted in both of the intake port and the cylinder. Further, the present invention can be applied to an engine not mounted with a variable valve unit such as a variable valve timing controller. The present invention can be variously modified and put into practice within a range not departing from the spirit and scope of the present invention.

What is claimed is:

1. A knock detection device for an internal combustion engine, comprising:
    a knock signal output unit for outputting an output signal of which waveform is varied according to a knock caused while the internal combustion engine is operated;
    a vibration intensity extraction unit for extracting time-varying patterns of vibration intensity in multiple frequency ranges from the output signal of the knock signal output unit; and
    a knock determination unit for executing a knock determination based on a determination of whether a number of time-varying patterns of vibration intensity which rise at a same time is greater than a determination threshold value;
    wherein the knock determination unit determines that a knock is caused when the number of the time-varying patterns of vibration intensity is greater than the determination threshold value.

2. A knock detection device according to claim 1, wherein the vibration intensity extraction unit performs a time-frequency analysis of the output signal in order to extract the time-varying patterns of vibration intensity in multiple frequency ranges.

3. A knock detection device according to claim 1, wherein the vibration intensity extraction unit processes an output signal of the knock signal output unit by a plurality of band pass filters extracting a plurality of specified frequency ranges to extract the time-varying patterns of vibration intensity in the multiple frequency ranges.

4. A knock detection system diagnosis device for an internal combustion engine, comprising:
    a knock signal output unit for outputting an output signal of which waveform is varied according to a knock vibration caused while the internal combustion engine is operated;
    a vibration intensity extraction unit for extracting time-varying patterns of vibration intensity in multiple frequency ranges from the output signal of the knock signal output unit; and
    a diagnosis unit for determining whether the knock signal output unit is faulty based on a number of the time-varying patterns of vibration intensity which rise at a same time during a period in which the internal combustion engine is operated under a condition where a knock is caused or during a period in which an ignition timing is advanced to compulsorily cause a knock, wherein
    the diagnosis unit compares the number of the time-varying patterns of vibration intensity with a determination threshold, and
    when the number of the time-varying patterns of vibration intensity is not equal to the determination threshold, the diagnosis unit determines that the knock signal output unit is faulty.

5. A knock detection system diagnosis device according to claim 4, wherein
    the vibration intensity extraction unit performs a time-frequency analysis of an output signal of the knock signal output unit to extract the time-varying patterns of vibration intensities in multiple frequency ranges.

6. A knock detection system diagnosis device according to claim 4, wherein the vibration intensity extraction unit processes an output signal of the knock signal output unit by a plurality of band pass filters extracting a plurality of specified frequency ranges to extract the time-varying patterns of vibration intensities in multiple frequency ranges.

7. A knock detection system diagnosis device for an internal combustion engine comprising:
    a knock signal output unit for outputting an output signal of which waveform is varied according to a knock vibration caused while the internal combustion engine is operated;
    a vibration intensity extraction unit for extracting time-varying patterns of vibration intensity in multiple frequency ranges from the output signal of the knock signal output unit; and
    a diagnosis unit for determining whether the knock signal output unit is faulty based on a number of the time-varying patterns of vibration intensity which rise at a same time during a period in which a vibration noise is generated or a vibration noise is compulsorily generated, wherein
    the diagnosis unit compares the number of the time-varying patterns of vibration intensity with a determination threshold, and
    when the number of the time-varying patterns of vibration intensity is not equal to the determination threshold, the diagnosis unit determines that the knock signal output unit is faulty.

8. A knock detection system diagnosis device according to claim 7, wherein
    while the diagnosis unit performs a diagnosis, the diagnosis unit retards an ignition timing to restrict an occurrence of a knock.

9. A knock detection device for an internal combustion engine, comprising:
    a knock signal output unit for outputting an output signal of which waveform is varied according to a knock caused while the internal combustion engine is operated;
    a vibration intensity extraction unit for extra time-varying patterns of vibration intensity in multiple frequency ranges from the output signal of the knock signal output unit; and
    a knock determination unit for executing a knock determination based on a number of time-varying patterns of vibration intensity which rise at a same time;
    wherein the vibration intensity extraction unit processes an output signal of the knock signal output unit by a plurality of band pass filters extracting a plurality of specified frequency ranges to extract the time-varying patterns of vibration intensity in the multiple frequency ranges.

10. A knock detection system diagnosis device for an internal combustion engine, comprising:

a knock signal output unit for outputting an output signal of which waveform is varied according to a knock vibration caused while the internal combustion engine is operated;

a vibration intensity extraction unit for extracting time-varying patterns of vibration intensity in multiple frequency ranges from the output signal of the knock signal output unit; and a diagnosis unit for determining whether the knock signal output unit is faulty based on a number of the time-varying patterns of vibration intensity which rise at a same time during a period in which an ignition noise is generated or an ignition noise is compulsorily generated, wherein the diagnosis unit compares the number of the time-varying patterns of vibration intensity with a determination threshold, and when the number of the time-varying patterns of vibration intensity is not equal to the determination threshold, the diagnosis unit determines that the knock signal output unit is faulty.

11. A knock detection system diagnosis device for an internal combustion engine, comprising:

a knock signal output unit for outputting an output signal of which waveform is varied according to a knock vibration caused while the internal combustion engine is operated;

a vibration intensity extraction unit for extracting time-varying patterns of vibration intensity in multiple frequency ranges from the output signal of the knock signal output unit; and a diagnosis unit for determining whether the knock signal output unit is faulty based on a number of the time-varying patterns of vibration intensity which rise at a same time during a period in which the internal combustion engine is operated under a condition where a knock is caused or during a period in which an ignition timing is advanced to compulsorily cause a knock;

wherein the vibration intensity extraction unit processes an output signal of the knock signal output unit by a plurality of band pass filters extracting a plurality of specified frequency ranges to extract the time-varying patterns of vibration intensities in multiple frequency ranges.

* * * * *